United States Patent
Chin et al.

(10) Patent No.: US 9,758,166 B2
(45) Date of Patent: *Sep. 12, 2017

(54) SYSTEMS AND METHODS FOR CHANGING MODES OF CONTROL

(71) Applicant: Elwha LLC, Bellevue, WA (US)

(72) Inventors: Hon Wah Chin, Palo Alto, CA (US); Roderick A. Hyde, Redmond, WA (US); Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,944

(22) Filed: Jan. 9, 2015

(65) Prior Publication Data

US 2016/0200322 A1    Jul. 14, 2016

(51) Int. Cl.
*B60W 30/18* (2012.01)
*B60W 30/182* (2012.01)

(52) U.S. Cl.
CPC .......... *B60W 30/18* (2013.01); *B60W 30/182* (2013.01); *B60W 2540/00* (2013.01); *B60W 2540/10* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 4,224,907 A | 9/1980 | Lefeuvre et al. | |
| 5,193,640 A * | 3/1993 | Lee | B60K 26/00 180/271 |
| 5,738,610 A * | 4/1998 | Hung | B60K 26/02 477/193 |
| 5,797,467 A | 8/1998 | Watanabe | |
| 5,836,400 A | 11/1998 | Tupper et al. | |
| 6,889,791 B2 | 5/2005 | Watanabe | |
| 7,513,807 B2 * | 4/2009 | Kinoshita | B63B 35/731 440/1 |
| 8,255,121 B2 | 8/2012 | Zagorski et al. | |
| 2005/0134470 A1 * | 6/2005 | Bos | A63B 71/06 340/665 |
| 2007/0142169 A1 * | 6/2007 | Marcil | B60K 28/06 477/107 |
| 2010/0060604 A1 | 3/2010 | Zwart et al. | |

* cited by examiner

*Primary Examiner* — Mussa A Shaawat
*Assistant Examiner* — Abdhesh Jha
(74) *Attorney, Agent, or Firm* — Foley & Lardner LLP (57) ABSTRACT

A system for controlling equipment according to different modes includes an input device configured to be engaged by a user and a control circuit coupled to the input device and configured to control operation of equipment based on engagement of the user with the input device. The control circuit controls operation of the equipment according to a first mode when the degree of engagement between the user and the input device is within a predefined range. The control circuit controls operation of the equipment according to a second mode different from the first mode when the degree of engagement between the user and the input device is outside of the predefined range.

33 Claims, 6 Drawing Sheets

SYSTEMS AND METHODS FOR CHANGING MODES OF CONTROL

BACKGROUND

The present disclosure relates generally to systems and methods for controlling equipment according to different modes of operation. More specifically, the present disclosure relates to controlling various types of equipment based on the degree of physical engagement or interaction of a user with a control member.

SUMMARY

One embodiment relates to a system for controlling equipment according to different modes, comprising an input device configured to be engaged by a user; and a control circuit coupled to the input device and configured to control operation of equipment based on engagement of the user with the input device; wherein the control circuit controls operation of the equipment according to a first mode when the degree of engagement between the user and the input device is within a predefined range; and wherein the control circuit controls operation of the equipment according to a second mode different from the first mode when the degree of engagement between the user and the input device is outside of the predefined range.

Another embodiment relates to a method of operating equipment in different modes, comprising determining whether a degree of physical engagement of a user with an input device is within a predefined range; controlling operation of equipment according to a first mode of operation based on a determination that the degree of engagement is within the predefined range; and controlling operation of the equipment according to a second mode of operation based on a determination that the degree of engagement is outside the predefined range.

Another embodiment relates to a vehicle, comprising a control member; a propulsion system configured to propel the vehicle; and a control system coupled to the control member and the propulsion system, the control system configured to control operation of the propulsion system based on user engagement with the control member; wherein the control system controls operation of the propulsion system according to a first mode when the degree of engagement of the user with the control member is within a predefined range; and wherein the control system controls operation of the propulsion system according to a second mode different from the first mode when the degree of engagement of the user with the control member is outside of the predefined range.

Another embodiment relates to a method of operating equipment in different modes, comprising controlling operation of equipment according to a first mode based on a degree of engagement of a user with an input device being within a predefined range; controlling operation of the equipment according to a second mode different from the first mode based on the degree of engagement of the user with the input device being outside the predefined range; determining that the degree of engagement of the user with the input device is maintained outside the predefined range for a predetermined period of time; and controlling operation of the equipment according to the second mode when the degree of engagement of the user with the input device is within the predefined range based on the degree of engagement of the user with the input device being outside the predefined range for the predetermined period of time.

Another embodiment relates to a system for controlling equipment using an input device, comprising a grip control configured for engagement with a user's hand; and a control system configured to control operation of equipment based on physical engagement of the user with the grip control; wherein the control system is configured to maintain the equipment in an inactive state based on the degree of engagement being within a normal usage range; and wherein the control system is configured to activate the equipment based on the degree of engagement being outside of the normal usage range.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Users can control various types of devices or equipment (e.g., vehicles such as automobiles and motorcycles, recreational vehicles such as snowmobiles, jet skis, etc. handicap-assist devices such as walkers, wheelchairs, etc., powered handicap-assist devices such as mobility scooters, etc.) through physical engagement with one or more control members, such as grip controls, pedals, and similar control members. For example, a driver of a car can depress an accelerator foot pedal, a driver of a motorcycle can rotate, or twist, a hand grip throttle control, etc. One or more sensors, such as a pressure sensor or position sensor, can be coupled to the control member and provide signals to a control system based on the physical engagement of the user with the control member (e.g., a pressure or force applied to the control member, a displacement of the control member, etc.). The control system can be configured to control operation of the equipment (e.g., throttle, brake system, etc.) accordingly.

In some cases, users may panic during operation of equipment (e.g., when an operator of a car suddenly encounters a road blockage, etc.) and react by physically engaging the control member to a degree outside of a normal range. For example, a driver of a car may unintentionally react to a nearby collision by suddenly fully depressing the accelerator pedal rather than engaging the brake, a motorcycle driver may react to a road blockage by suddenly twisting the throttle control, etc. As another example, a handicap-assist device, such as a wheeled walker, may include a grip portion intended to be grasped by a user to direct the wheeled walker. Should the user lose his or her balance, the amount of force applied to the grip may suddenly increase. In many cases, it may be desirable to control operation of the equipment (e.g., throttle, engine, brake, etc.) so as to avoid undesirable consequences due to sudden user reactions.

As such, various embodiments disclosed herein relate to systems and methods for controlling equipment based on the degree of physical engagement or interaction with a user input device or control member. The physical engagement may be a force or pressure applied to a control member, a displacement of the control member, or other interaction, such that the degree of engagement is defined by the amount of force, pressure, displacement, etc. In one embodiment, while the degree of physical engagement is within an acceptable range, the equipment is operated according to a first, or normal, operational mode. Should the degree of physical engagement of the user with the control member be outside of (e.g., above or below) the acceptable range, the equipment is operated according to a second, or safety, operational mode (e.g., a panic mode). The second mode may operate over a range of non-zero degrees of engagement according to various alternative embodiments (e.g., relatively low ranges and/or relatively high ranges of engagement outside of a normal operating range).

Operating in a safety mode can include various actions, including deactivating a device, turning off an engine or motor, maintaining a current operating state of equipment, and the like. Furthermore, the extent to which a system remains in a safety mode is in some embodiments variable based on a number of factors. For example, in one embodiment, a system is configured to remain in a safety or panic mode even when a degree of physical engagement returns to a normal range, in certain circumstances, including, for example, if the degree of physical engagement of the user with the control member is sustained outside of an acceptable range for a certain period of time (e.g., 2-3 seconds). In other embodiments, a system may return to a normal mode after a delay, even if the degree of physical engagement is outside of the acceptable range (e.g., in the case of a component fault, etc.). In further embodiments, the system returns to a normal mode after a delay after a degree of physical engagement returns to a normal range.

Figure 1:
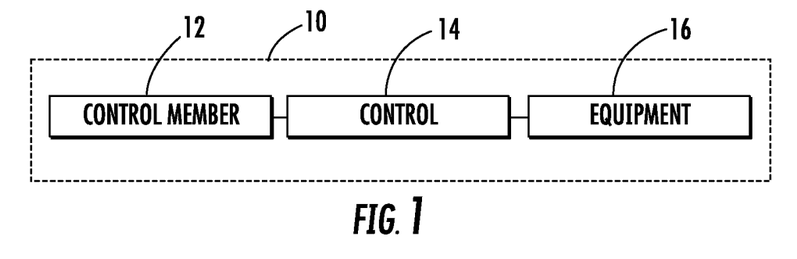
FIG. 1 is a schematic illustration of a system for controlling equipment according to various modes according to one embodiment.

Referring now to FIG. 1, system 10 is shown according to one embodiment, and includes control member 12, control system 14, and equipment 16. In one embodiment, control system 14 receives inputs from control member 12, and controls equipment 16 accordingly. For example, control member 12 can receive inputs from users by way of physical engagement of the user with control member 12, and based on the physical engagement of the user with control member 12, can provide one or more control signals to control operation of equipment 16.

System 10 can be any of a variety of systems utilizing a control member, control system, and equipment such as those disclosed herein. In some embodiments, system 10 can be a vehicle system including a throttle control member, a control system, and a throttle. Based on manipulation of the throttle control member, the control system sends appropriate control signals to the throttle. For example, a throttle control member can be implemented as an accelerator pedal, a grip throttle control, or another device. In other embodiments, system 10 can be usable with a wheelchair, a wheeled walker, or similar device, such that the control member can be a motor control, a brake control, or other control member configured to enable physical engagement by a user, and such that a control system controls appropriate equipment, such as an electric motor, a brake system, etc., based on user interaction with the control member.

Figure 2:
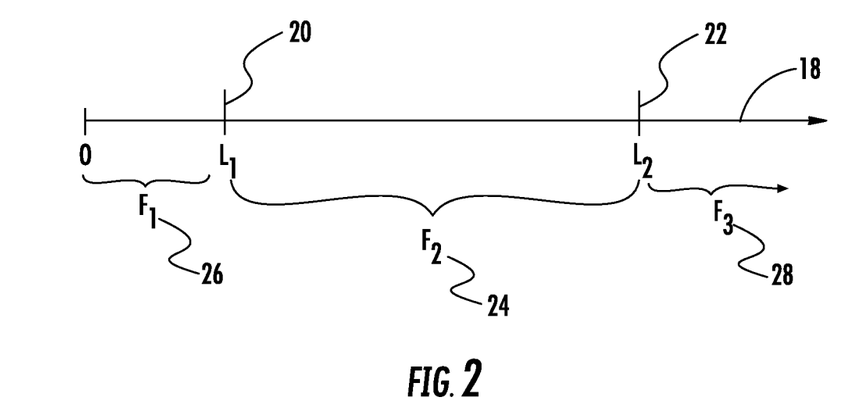
FIG. 2 is an illustration of various ranges of interaction of a user with a control member according to one embodiment.

According to various alternative embodiments, users can interact with control members in a variety of ways. For example, in some embodiments, a user can apply a force to a control member (e.g., in the case of a hand grip control, or a foot pedal). Additionally, a user can displace a control member through rotation, linear displacement, or combinations thereof. Referring to FIG. 2, various ranges of physical engagement (e.g., force, displacement, pressure, etc.) are schematically illustrated according to one embodiment. As shown in FIG. 2, the degree of physical engagement of a user with a control member increases along line 18. First threshold 20 defines a lower limit of a normal, or acceptable, range of engagement 24, and second threshold 22 defines an upper limit of the normal, or acceptable, range of engagement 24.

In addition to range 24, first and second thresholds 20, 22 define lower range 26 (below first threshold 20) and upper range 28 (above second threshold 22). Lower range 26 and/or upper range 28 define ranges of interaction that may indicate a user is panicking, or otherwise interacting with a control member in an undesirable manner. In various embodiments, control system 14 is configured to control operation of a device or equipment based on the degree of physical engagement or interaction of a user with a control member. Control system 14 controls the equipment according to a first mode or protocol when the degree of physical engagement or interaction with the control member is within, for example, range of engagement 24. Control system 14 controls the equipment according to a second mode or protocol when the degree of physical engagement of interaction is outside of range 24, and falls within one of lower range 26 and upper range 28. While the Figures generally show a single upper and a single lower threshold, according to various alternative embodiments, multiple upper and/or lower thresholds may be used to control equipment according to different secondary modes of control. For example, at a first threshold relative relatively closer to a normal range of interaction, the second mode may include a warning (e.g., an alarm, etc.), while at a second threshold relatively farther from the normal range of interaction, additional action is taken (e.g., a safety mechanism is actuated, etc.). Multiple levels of thresholds may be used according to various alternative embodiments.

In one embodiment, the first mode or protocol of operation (while the degree of physical engagement is within a normal range) provides for controlling the equipment in a manner generally proportional to the degree of engagement. For example, with various control members such as pedals, twistable grip controls, etc., the desired operation (e.g., accelerating, braking, etc.) is normally dependent upon the extent to which a pedal is depressed, a grip is rotated, etc. In other embodiments, control can be based on a stepped function, a monotonic function, or another manner of control. Should the degree of engagement fall outside of a normal range, operation of the equipment can be changed to the second mode or protocol (e.g., a safety mode).

In an alternative embodiment, the first mode or protocol of operation (while the degree of physical engagement is within a normal range) provides for maintaining equipment in a generally disengaged, or deactivated state, such that the equipment is engaged, or activated, only when the degree of physical engagement falls outside of the normal range. For example, various handicap-assist devices (wheeled walkers, wheelchairs, etc.) may be provided with a safety brake or other safety device (e.g., an airbag, etc.) that is normally inactive but is activated should a user, for example, suddenly grip a grip control or other control member (e.g., a brake release lever of a walker, etc.) with significantly increased force or pressure. As such, in some embodiments, the second mode of control is implemented in some embodiments by way of a separate (e.g., add-on, etc.) system (e.g., a safety brake of a walker, motorcycle, etc.) that is actuated by way of monitoring physical engagement with a primary control member (e.g., a brake release lever of a walker, a brake lever of a motorcycle, etc.). In one embodiment, the second mode of control is implemented as an add-on to an existing control system.

The second mode of operation can include various types of control. In one embodiment, the first mode of control includes maintaining equipment at a current operational state. In an alternative embodiment, the second mode of control includes deactivating equipment (e.g., an engine, a motor, etc.). In further embodiments, the second mode of control includes actuating a safety mechanism, alarm, or other device or system. In yet further embodiments, when the degree of engagement is below the normal range (e.g., within lower range 26 shown in FIG. 2), the second mode of control is based on a first sub-protocol, and when the degree of engagement is above the normal range (e.g., within upper range 28 shown in FIG. 2), the second mode of control is based on a second sub-protocol. The first and second sub-protocols can provide for the same or different types of control. According to yet further embodiments, the first and/or second modes or protocols of operation can take other forms and be triggered in other ways in order to suit a particular application or equipment.

In some embodiments, the upper and/or lower limits of the normal range are variable. For example, in some embodiments, the normal range is variable based on various sensed internal and/or external factors, such as vehicle speed, acceleration, traction, etc., road conditions, such as ice, wetness, etc., and the like. As such, in less desirable driving conditions (e.g., due to poor weather), a vehicle may trigger a second (e.g., safety) mode of control sooner (e.g., by using a smaller normal range of operation) than would otherwise happen under ideal driving conditions. In various alternative embodiments, the normal range may be based on one or more user parameters, such as historical data regarding the user's operation of equipment, one or more user inputs defining upper or lower limits for a normal range, an allowable deviation from a historical standard of engagement by the user (e.g., a set amount more or less than a previous maximum or minimum, etc.). The upper and lower limits of a normal range of operation may be based on other factors according to various other embodiments.

In yet further embodiments, the second mode of control is triggered by a rate of change in user interaction with a control member being outside of a normal range. For example, the second mode may be triggered based on a rate of change of actuation, or a rate of change in an actuating force. As such, sudden increases in grip force, pedal force, grip rotation, pedal deflection, etc. may further be used to trigger the second mode of operation.

Figure 3A:
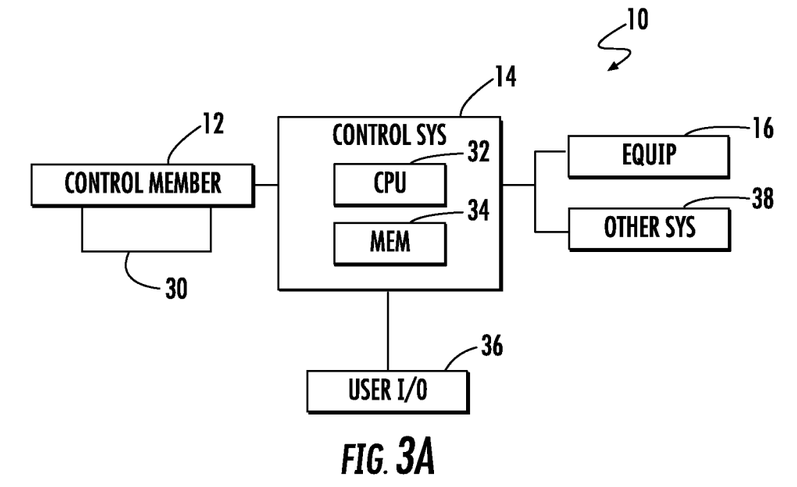
FIG. 3A is a schematic illustration of the system of FIG. 1 shown in greater detail according to one embodiment.

Referring now to FIG. 3A, system 10 is shown in greater detail according to one embodiment. As noted above, system 10 includes control system 14 configured to control operation of equipment 16 based on signals received from control member 12. In one embodiment, control member 12 includes sensor 30 configured to acquire input data regarding a physical engagement of a user with control member 12. Control member 12 provides the input data to control system 14. Control system 14 includes processor 32 and memory 34. Control system 14 is configured to receive the input data from control member 12 and control operation of equipment 16 accordingly. Based on the input data, control system 14 may further control a user input/output device such as device 36 (e.g., a light, alarm, buzzer, etc.) or other systems 38 (e.g., emergency response systems, etc.).

Sensor 30 can be any of a variety of sensors configured to acquire data (e.g., input data) regarding the physical engagement or interaction of a user with control member 12. In one embodiment, sensor 30 is or includes a force or pressure sensor configured to sense an applied force or pressure to control member 12. In other embodiments, sensor 30 is or includes a position sensor configured to sense a movement or position of control member 12, such as a degree of rotation, a distance of linear displacement, and the like. Combinations of sensors can be used according to various alternative embodiments. For example, in one embodiment, sensor 30 can include both a pressure or force sensor and a position sensor. Other types of sensors can sense other types of physical engagement of a user with control member 12 according to various other alternative embodiments. In some embodiments sensor 30 is configured to provide an indication of a threshold (e.g., an upper or lower limit of a normal range of operation) being exceeded (e.g., by way of an audible, visual, haptic, or other indication), which as disclosed elsewhere herein may be triggered based on historic data regarding a user.

Control system 14 (e.g., a processing circuit) includes processor 32 and memory 34. Processor 32 may be implemented as a general-purpose processor, an application specific integrated circuit (ASIC), one or more field programmable gate arrays (FPGAs), a digital-signal-processor (DSP), a group of processing components, or other suitable electronic processing components. Memory 34 is one or more devices (e.g., RAM, ROM, Flash Memory, hard disk storage, etc.) for storing data and/or computer code for facilitating the various processes described herein. Memory 34 may be or include non-transient volatile memory or non-volatile memory. Memory 34 may include database components, object code components, script components, or any other type of information structure for supporting the various activities and information structures described herein. Memory 34 may be communicably connected to processor 32 and provide computer code or instructions to processor 32 for executing the processes described herein.

Equipment 16 can include a wide range of equipment, including vehicle components, medical equipment or devices, and the like. For example, in one embodiment equipment 16 includes a power control (e.g., throttle device) for an engine (e.g., a vehicle engine). In another embodiment, equipment 16 can be or include a power control for an electric motor. In yet further embodiments, equipment 16 can be other types of equipment suitable for control via control system 14 based on physical engagement of a user with control member 12 (e.g., vehicle propulsion or brake systems, hydraulic systems, components of mechanical devices such as jackhammers, etc., and so on). Equipment 16 is configured to be controlled based on control signals received from control system 14. The control signals are generated based on the input data received by control system 14 from control member 12 and sensor 30.

Device 36 can include a variety of input and output devices configured to provide outputs to or receive inputs from a user. For example, in one embodiment, device 36 can include an indicator device configured to provide a user with an indication that the physical engagement of the user with a control member is outside of a normal range (e.g., range 24 shown in FIG. 2), or alternatively, within but approaching an upper or lower limit of the normal range. As such, device 36 can include a visual indicator device (e.g., a display device, a light, etc.), an audible indicator device (e.g., a speaker, alarm, buzzer, etc.), a tactile indicator device (e.g., a vibrating member, etc.), or combinations thereof. Other indicator devices can be used according to various other embodiments, including touch screens, electronic displays, etc.

Device 36 can also enable a user to provide various inputs to control system 14. As such, in some embodiments device 36 includes one or more input devices such as a microphone, keyboard, touchscreen, etc. Device 36 can be usable to, for example, enable a user to provide an input to terminate a current mode of operation (e.g., a safety mode). Alternatively, device 36 can enable a user to provide inputs defining an acceptable range of engagement for a control member. Device 36 can receive other types of inputs according to various other alternative embodiments. Further, device 36 can be configured to receive and transmit data to/from one or more remote devices or systems.

In some embodiments, control system 14 is configured to control operation of or provide data to other systems 38. Systems 38 can include additional systems coupled to control system 14 that may, for example, work in cooperation with equipment 16, or alternatively, provide a type of safety mechanism should engagement with a control device be outside of a normal range. One example of systems 38 is a braking system that is usable in connection with a power control system for a vehicle or other device. The power control system may be controlled via a control member such as control member 12 (e.g., an accelerator pedal). Should a user's physical interaction with the accelerator pedal suddenly move outside of an acceptable range, the braking system can be activated to avoid sudden undesirable acceleration of the car (instead of or in addition to operating the power control system in a safety, or panic, mode). Alternatively, systems 38 can include one or more safety systems, such as an airbag system or other safety mechanism configured to be actuated or deployed based on the user's physical engagement with a control member. The physical interaction with the accelerator pedal can be determined using a sensor such as sensor 30, which in various embodiments can be a position sensor (e.g., to detect the position of the pedal), a force or pressure sensor (e.g., to detect the amount of force or pressure being applied to the pedal), or another sensor.

While in some embodiments, control system 14 is configured to control operation of equipment 16 based on signals regarding a single control member such as control member 12, in various other embodiments, control system 14 is configured to control operation of equipment 16 based on a variety of other factors, including additional sensors, additional control members, and/or other user or control inputs. For example, referring to FIG. 3B, system 10 is shown in greater detail according to an alternative embodiment. System 10 includes multiple control members 12. One or more of control members 12 may include multiple sensors (e.g., sensors S1, S2, S3).

Figure 3B:
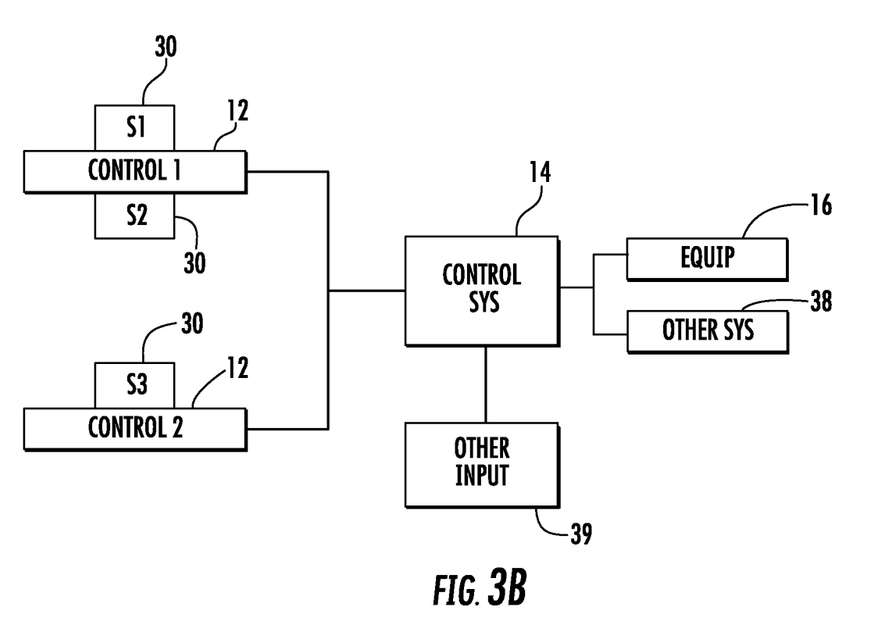
FIG. 3B is a schematic illustration of the system of FIG. 1 shown in greater detail according to another embodiment.

In some embodiments, control system 14 is configured to selectively control equipment 16 using either the first or second mode of control based on multiple sensors configured to sense data regarding a single control member. For example, control system 14 may receive force and position inputs from sensors 30 regarding a grip or pedal control and control operation of equipment 16 accordingly (e.g., in one of the first and second mode).

In other embodiments, data regarding multiple user inputs and/or multiple control members may be used to select one of the first and second modes of control. For example, control system 14 may receive data regarding a first control member (e.g., a left side brake lever) and a second control member (e.g., a right side brake lever), and control equipment 16 accordingly. Control system 14 may be configurable to use any combination of thresholds, such as requiring a degree of physical engage with only one of two control members to exceed a threshold to trigger the second mode, requiring the degree of physical engagement with both control members to exceed thresholds to trigger the second mode, requiring an aggregate (e.g., a sum of forces, etc.) of physical engagement with both control members to exceed a threshold to trigger the second mode, and the like. While FIG. 3B shows two control members 12, it should be understood that the teachings herein may be extended to more than two control members in a similar manner.

In yet further embodiments, control system 14 is configured to further selectively control equipment 16 in one of the first and second mode based on other control inputs, such as other input 39. For example, in the case of a vehicle, operating conditions such as speed, acceleration, wheel traction, etc. may be taken into account. Further, external conditions such as road conditions, weather conditions, and the like may be taken into account. For example, control system 14 may take into account whether road traction is below a threshold level, whether the ambient temperature is outside a normal range, whether the vehicle speed is outside of a normal range, etc. According to various other embodiments, control system 14 mat take other factors into account in selectively controlling operation of equipment 16 in the first or second mode.

Figure 4:
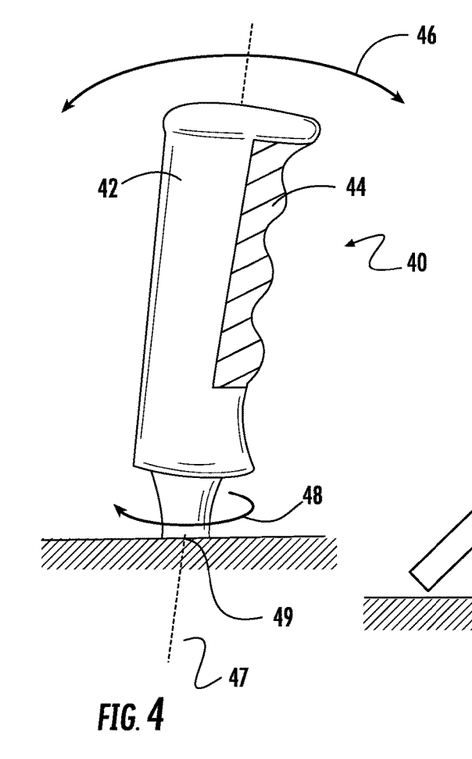
FIG. 4 is a side view of a control member according to one embodiment.

Referring to FIG. 4, an embodiment of a control member is shown as grip control 40. Grip control 40 can be configured to provide control over various types of devices and equipment, including medical devices, handicap-assist devices, vehicles, and the like. Grip control 40 includes a grip 42 and a sensor 44. Grip 42 is configured to enable a user to grasp grip control 40. Sensor 44 is configured to sense the degree of physical interaction with grip control 40. In one embodiment, sensor 44 is integrated into and forms a part of the surface of grip control 40. In other embodiments, sensor 44 can be provided in other locations to measure various forces, pressures, or movements related to grip control 40. Sensor 44 provides input signals to a control system such as control system 14 based on the user's physical engagement with grip control 40.

In one embodiment, grip control 40 is generally fixed relative to a larger device, as in the case of a grip control for a wheeled walker or similar device. As such, sensor 44 can be configured to measure the force applied to grip control 40 as the user manipulates (e.g., steers, pushes, etc.) a wheeled walker or other device along a desired path, or uses a wheeled walker to move between sitting and standing positions, etc. In another embodiment, grip control 40 is configured to be moved via physical engagement by a user to provide inputs to a control system. For example, as shown in FIG. 4, grip control 40 can be rotated about longitudinal axis 47 and along arrow 48, or alternatively, grip control 40 can be pivoted about a pivot point such as pivot point 49 and along arrow 46. Other types of movement for grip control 40 are possible according to various other embodiments.

Figures 5, 7:
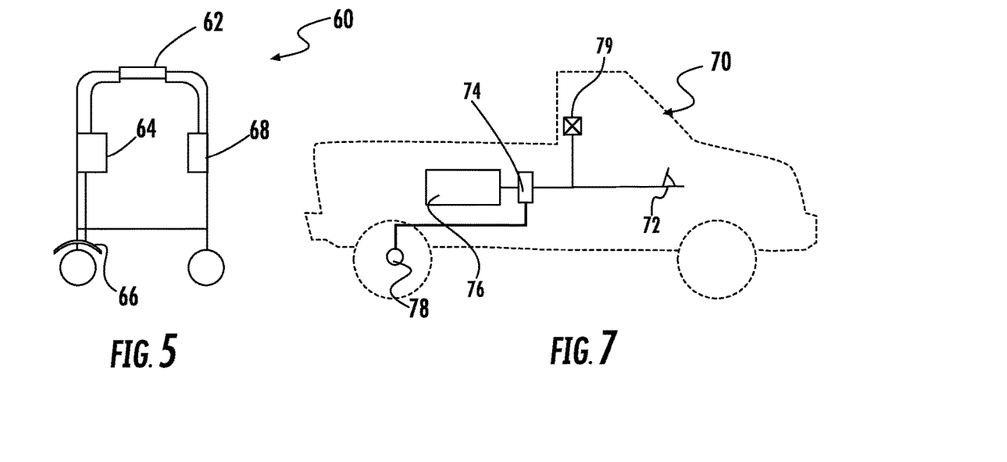
FIG. 5 is a schematic representation of a handicap assist device according to one embodiment.
FIG. 7 is a schematic representation of vehicle according to one embodiment.

Referring to FIG. 5, a handicap-assist device 60 is shown according to one embodiment and includes grip portion 62, control system 64, and safety brake 66. Grip portion 62 can include any of the features of control member 12 and/or grip control 40 discussed herein, and is configured to enable a user to move device 60, or to use device 60 as support when, for example, moving between sitting and standing positions, etc. Grip portion 62 provides input signals to control system 64, which in turn controls operation of a safety brake system 66 accordingly. For example, in one embodiment, as long as the force or pressure applied to grip portion 62 is within an acceptable range, control system 64 maintains safety brake 66 in a disengaged state, such that a user can freely move device 60. However, should the force or pressure on grip portion 62 move outside of the acceptable range, control system 64 engages safety brake 66 to stabilize or prevent movement of device 60.

In an alternative embodiment, device 60 can further include safety mechanism 68. In addition to engaging safety brake 66, control system 64 can be further configured to actuate safety mechanism 68 should the force or pressure on grip portion 62 move outside of the acceptable range. Safety mechanism 68 can be an airbag or other device configured to enhance the safety of a user of device 60. Alternatively, safety mechanism 68 can be or include an output device (e.g., similar to output device 36) configured to provide an alert or alarm (e.g., a visual, audible, or tactile indication) based on the force or pressure on grip portion 62 moving outside of the acceptable range.

Figure 6:
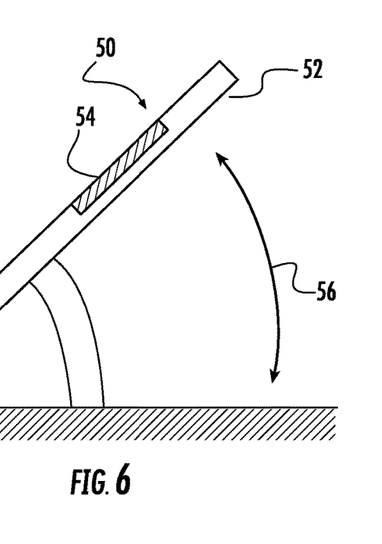
FIG. 6 is a side view of a control member according to an alternative embodiment.

Referring to FIG. 6, an alternative embodiment of a control member is shown as pedal 50. Pedal 50 can be configured to provide control over various types of devices and equipment, including vehicles such as automobiles. Pedal 50 includes a pedal member 52 and sensor 54. Pedal member 52 is configured to enable a user to depress pedal 50 by way of a user's foot. Sensor 54 is configured to sense the degree of physical interaction with pedal 50. In one embodiment, sensor 54 is integrated into and forms a part of the surface of pedal 50. In other embodiments, sensor 54 can be provided in other locations to measure various forces, pressures, or movements related to pedal 50. Sensor 54 provides input signals to a control system such as control system 14 based on the user's physical engagement with pedal 50. In one embodiment, pedal 50 is configured to be moved via physical engagement by a user. For example, as shown in FIG. 6, pedal 50 can be rotated along arrow 56. Other types of movement for pedal 50 are possible according to various other embodiments.

Referring to FIG. 7, a vehicle 70 (e.g., an automobile, truck, bus, etc.) is shown according to one embodiment and includes pedal 72, control system 74, and engine 76. Pedal 72 can include any of the features of control member 12 and/or pedal 50 discussed herein, and is configured to enable a user to control operation of engine 76 while driving vehicle 70. Pedal 72 provides input signals to control system 74, which in turn controls operation of engine 76 (e.g., including a throttle) accordingly. In one embodiment, as long as the engagement with pedal 72 is within an acceptable range, control system 74 operates engine 76 according to a first, or normal mode, such that a user can operate vehicle 70 normally. However, should the engagement with pedal 72 move outside of the acceptable range (e.g., in terms of the position of the pedal or in terms of the force or pressure applied to the pedal, or both), control system 74 controls operation of engine 76 according to a second, or safety mode (e.g., such that the engine is maintained at a constant operating speed, the engine is operated at an idle, etc.).

In an alternative embodiment, vehicle 70 further includes brake system 78 and safety mechanism 79. In addition to operating engine 76 in a safety mode, control system 74 can be further configured to actuate brake system 78 and/or safety mechanism 79 should the engagement with pedal 72 move outside of an acceptable range. Safety mechanism 79 can be an airbag or other device configured to enhance the safety of a user of vehicle 70. Alternatively, safety mechanism 79 can be or include an output device (e.g., output device 36) configured to provide an alert or alarm (e.g., a visual, audible, or tactile indication) based on the degree of engagement with pedal 72 moving outside of the acceptable range.

It should be understood that while vehicle 70 is shown in FIG. 7 as being an automobile, according to various other embodiments, vehicle 70 can take other forms, including motorcycles, trucks, trains, buses, aircraft, watercraft, and the like. Likewise, in addition to use of a pedal as a control member, other types of control members can be utilized, including hand-operated control members, such as twist grips, knobs, levers, steering wheels, and the like.

Figure 8:
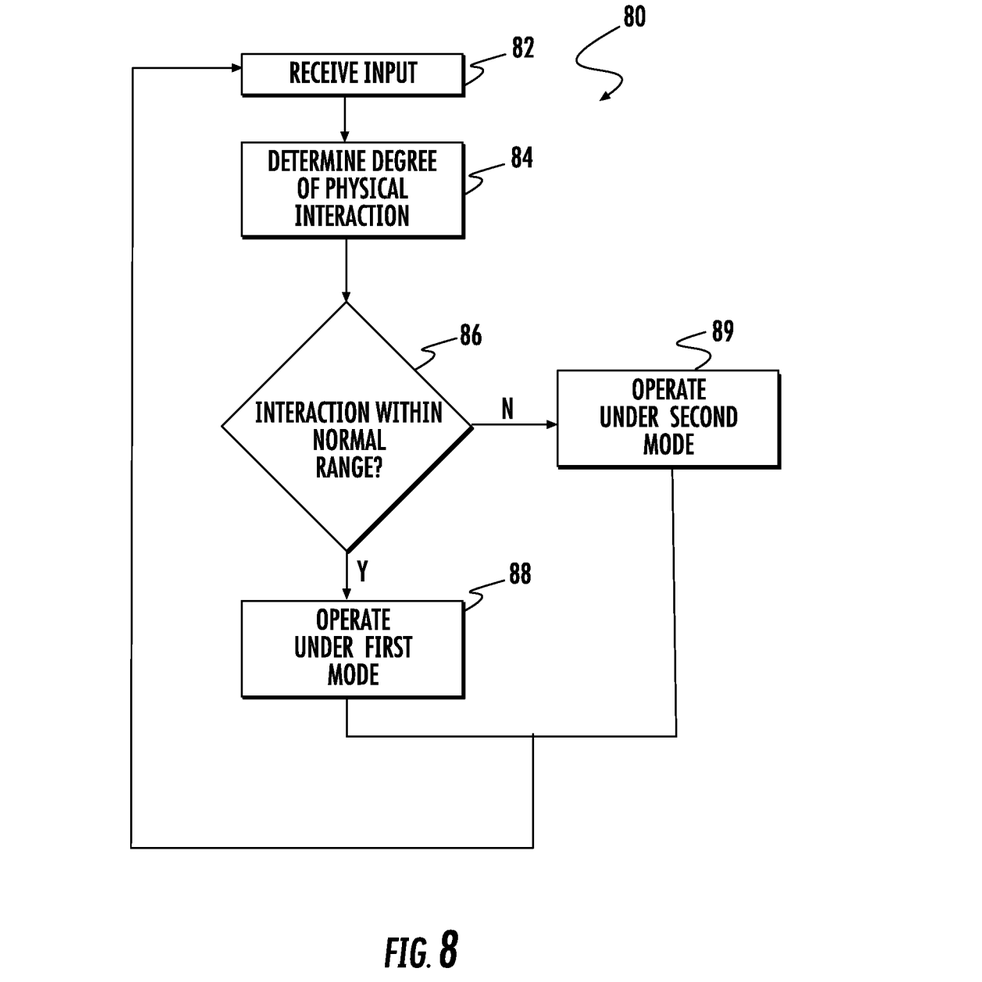
FIG. 8 is a block diagram showing a method of controlling equipment according to different modes according to one embodiment.

Referring now to FIG. 8, method 80 of controlling equipment is shown according to one embodiment. An input is received (82), for example, by way of a control member. The control member can take any suitable size or shape, and can include a sensor configured to sense the physical interaction of a user with the control member. The degree of physical interaction of the user with the control member is determined (84), for example, based on signals received from one or more sensors. The degree of physical interaction or engagement can be measured in a variety of ways, including an applied force or pressure, a displacement (e.g., rotational, linear, etc.), and the like. In some embodiments, the degree of engagement is determined through the use of multiple sensors over different ranges of or types of engagement, which may or may not overlap. For example, a pedal, handgrip, or similar device may be movable between one or more stops. A first sensor may measure the degree of displacement (e.g., angular, linear, etc.) of the device, while a second sensor may measure a force applied to a stop by the device (e.g., at maximum displacement). As such, the degree of engagement may be determined by multiple sensors, including displacement, force, and other types of sensors.

A determination is made as to whether the degree of physical engagement or interaction is within a predefined range (86). The predefined range is typically defined by upper and lower thresholds, which in some embodiments can be customized by a user.

If the degree of physical interaction or engagement is within the predefined range, the equipment is operated according to a first or normal mode of operation (88). The first mode of operation can include operating equipment in a manner proportional to the degree of engagement with a control member, or alternatively, can include maintaining equipment in a disengaged or inactive state. If the degree of engagement is outside of the predefined range, the equipment is operated according to a second, or safety mode (89). The second mode of operation can include modifying operation of the equipment relative to the first mode, or alternatively, activating or engaging equipment (from a disengaged or deactivated state). The second mode of operation can further include activating other systems (e.g., safety systems, alert systems, etc.). The method shown in FIG. 8 can be performed on a generally continuous basis and the mode of operational control changed accordingly based on, for example, changing user interactions with a control member.

Figure 9:
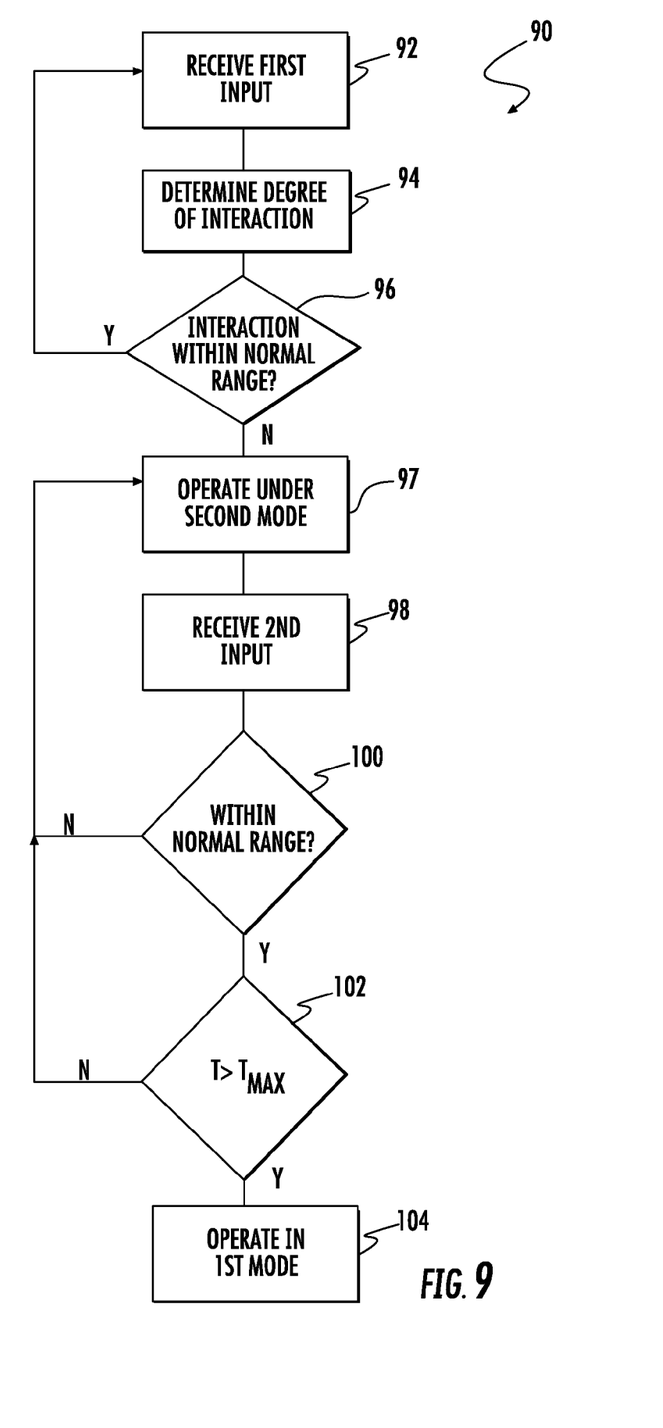
FIG. 9 is a block diagram showing a method of controlling equipment according to different modes according to another embodiment.

Referring to FIG. 9, method 90 of controlling equipment is shown according to another embodiment. A first input is received (92), for example, by way of a control member. The control member can take any suitable size or shape, and can include a sensor configured to sense the physical interaction of a user with the control member. The degree of physical interaction of the user with the control member is determined (94), for example, based on signals received from one or more sensors. The degree of physical interaction or engagement can be measured in a variety of ways, including an applied force or pressure, a displacement (e.g., rotational, linear, etc.), and the like. A determination is made as to whether the degree of physical engagement or interaction is within a predefined range (96). The predefined range is typically defined by at least one of an upper and lower (non-zero) threshold, which in some embodiments can be customized by a user. In some embodiments, the predefined range may defined using any suitable terms. For example, in the case of multi-axis controls such as joysticks, etc., the predefined range may be defined in terms of radial displacement from a primary axis, a force against a joystick stop, etc.

If the degree of physical interaction or engagement is within the predefined range, the equipment is operated according to a first or normal mode of operation (92). The first mode of operation can include operating equipment in a manner proportional to the degree of engagement with a control member, or alternatively, can include maintaining equipment in a disengaged or inactive state. If the degree of engagement is outside of the predefined range, the equipment is operated according to a second, or safety mode (97). The second mode of operation can include modifying operation of the equipment relative to the first mode, or alternatively, activating or engaging equipment (from a disengaged or deactivated state). The second mode of operation can further include activating other systems (e.g., safety systems, alert systems, etc.).

After the degree of physical interaction of the user with the control member is determined to be outside of a predefined range, a second input is received (98). The second input can be based on further physical engagement or interaction with a control member. A determination is made as to whether the degree of physical engagement or interaction based on the second input is back within the predefined range (100). If the degree of physical interaction or engagement is maintained outside the predefined range, the equipment is maintained in the second mode (97).

If the degree of physical interaction or engagement is within the predefined range, a determination is made as to whether the degree of physical engagement with the control member has been outside of the predefined range for a period of time (T) more than a threshold period of time (T max) (102). The threshold period of time can be any suitable time period (e.g., 2 or 3 seconds, etc.), and in some embodiments can be customizable by the user. If the degree of physical engagement with the control member has been outside of the predefined range for more than the threshold period of time, control of the equipment is maintained in the second mode (97), even though the current degree of physical engagement with the control member may be within the predefined range. If the degree of physical engagement with the control member has been outside of the predefined range for less than the threshold period of time, operation of the equipment is changed to the first mode (104).

The method shown in FIG. 9 provides for maintaining equipment in a safety mode of operation based on a user's degree of physical interaction or engagement with a control member being outside of a normal, or acceptable, range for a threshold period of time, even if the user subsequently modifies his or her interaction with the control member to be within the acceptable range. In some embodiments, the equipment is locked in the safety mode until a release input (e.g., an external reset) is received. The release input can be received by way of deactivating the equipment, by way of an input device such as device 36 (see FIG. 3) configured to receive touch, audible, or other inputs, or by way of a physical manipulation by the user (e.g., to physically release a safety mechanism such as a brake, etc.). In some embodiments the release input is triggered automatically after a predetermined period of time (e.g., such that a normal mode of operation is restored 5 seconds after the engagement returns (and remains within) a normal range, etc.).

Figure 10:
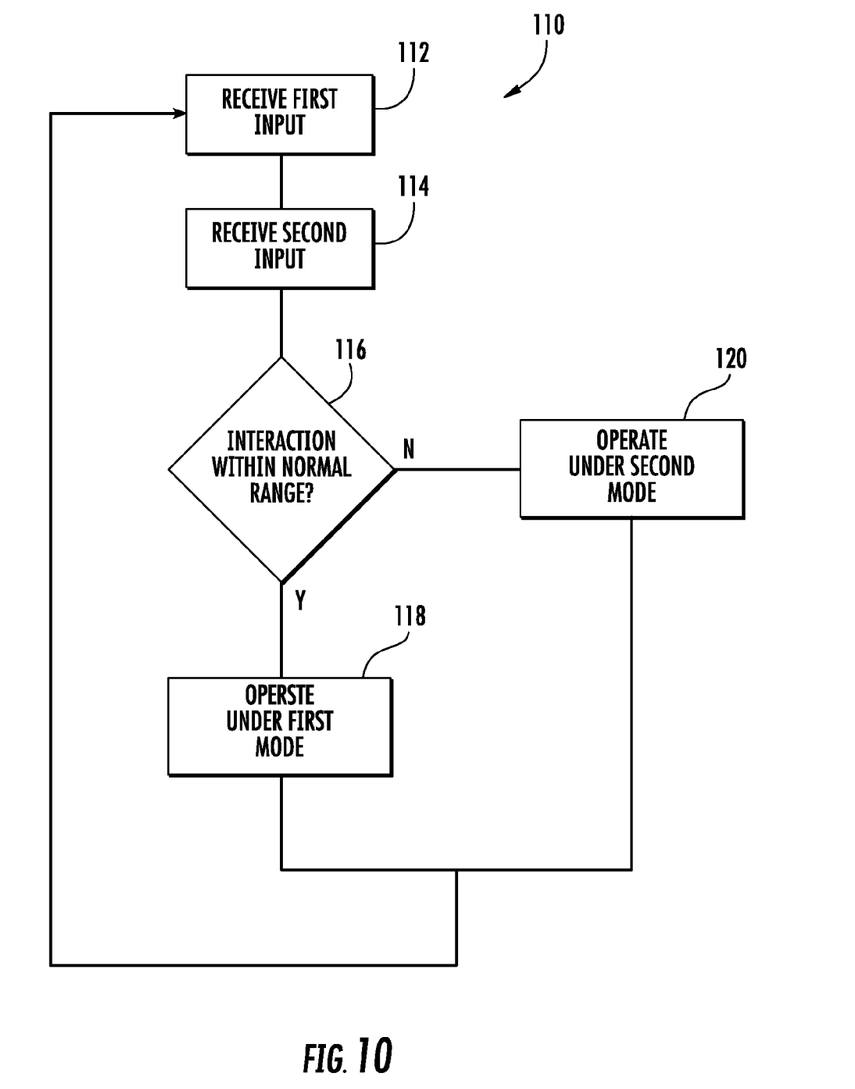
FIG. 10 is a block diagram showing a method of controlling equipment according to different modes according to another embodiment.

Referring to FIG. 10, method 110 of controlling equipment is shown according to one embodiment. A first input is received (112), for example, by way of a control member. The control member can take any suitable size or shape, and can include a sensor configured to sense the physical interaction of a user with the control member. A second input is received (114). The second input can be a second input regarding the same control member, a second input regarding a different control member, a second input regarding other control inputs (e.g., equipment operating parameters, operating conditions, etc.). For example, multiple inputs may be received regarding a steering wheel and an accelerator of a car, such that the car is placed into a safety mode if the user squeezes the steering wheel and slams the accelerator pedal. Alternatively, multiple inputs may be received regarding right and left brake levers, such that if both are squeezed simultaneously, a safety mode is triggered (e.g., for a walker device, etc.). The degree of physical interaction of the user with the control member(s) is determined (84) based on the first and/or second inputs. The degree of physical interaction or engagement can be measured in a variety of ways, including an applied force or pressure, a displacement (e.g., rotational, linear, etc.), and the like. A determination is made as to whether the degree of physical engagement or interaction is within a predefined range (116). The predefined range is typically defined by upper and lower thresholds, which in some embodiments can be customized by a user.

If the degree of physical interaction or engagement is within the predefined range, the equipment is operated according to a first or normal mode of operation (118). The first mode of operation can include operating equipment in a manner proportional to the degree of engagement with a control member, or alternatively, can include maintaining equipment in a disengaged or inactive state. If the degree of engagement is outside of the predefined range, the equipment is operated according to a second, or safety mode (120). The second mode of operation can include modifying operation of the equipment relative to the first mode, or alternatively, activating or engaging equipment (from a disengaged or deactivated state). The second mode of operation can further include activating other systems (e.g., safety systems, alert systems, etc.). The method shown in FIG. 10 can be performed on a generally continuous basis and the mode of operational control changed accordingly based on, for example, changing user interactions with a control member. Further, which FIG. 10 is shown with first and second inputs, the mode of control can be selected based further on additional inputs according to various alternative embodiments.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for controlling equipment according to different modes, comprising:

an input device configured to be engaged by a user; and
a control circuit coupled to the input device and configured to control operation of equipment based on engagement of the user with the input device;
wherein the control circuit controls operation of the equipment according to a first mode when the degree of engagement between the user and the input device is within a predefined range;
wherein the control circuit controls operation of the equipment according to a second mode different from the first mode when the degree of engagement between the user and the input device is outside of the predefined range;
wherein the control circuit is configured to control the equipment according to a first sub-protocol when the degree of engagement is below the predefined range and according to a second sub-protocol when the degree of engagement is above the predefined range; and
wherein the control circuit is configured to selectively vary the predefined range based on sensed environmental conditions.

2. The system of claim 1, wherein the degree of engagement of the user with the input device includes an amount of force applied to the input device by the user.

3. The system of claim 1, wherein the degree of engagement includes the user releasing the control member.

4. The system of claim 2, wherein the force is applied by a manual gripping of the input device by the user.

5. The system of claim 1, wherein the degree of engagement of the user with the input device includes a degree of displacement of the input device.

6. The system of claim 5, wherein the degree of displacement of the user input device includes a degree of rotation of the input device.

7. The system of claim 5, wherein the degree of displacement of the user input device includes an amount of linear displacement of the input device.

8. The system of claim 1, wherein the degree of engagement of the user with the input device is defined by both a force applied to the input device and a degree of displacement of the input device.

9. The system of claim 1, wherein the control circuit is configured to control operation of the equipment according to the second mode until a release input is received.

10. The system of claim 1, wherein the control circuit is configured to control operation of the equipment according to the second mode based on determining that the degree of interaction returns to within the predefined range after being outside of the predefined range for a threshold amount of time.

11. The system of claim 1, wherein the input device is a first input device, and further comprising a second input device;
wherein the control circuit is configured to selectively operate the equipment according to one of the first mode and the second mode based on user engagement with the first and second input devices.

12. The system of claim 11, wherein the control circuit is configured to selectively operate the equipment in one of the first mode and the second mode based on at least one of a first degree of engagement with the first input device being outside of a first predefined range and a second degree of engagement with the second input device being outside a second predefined range.

13. A powered handicap assist device, comprising:
a control member including a hand grip configured to be gripped and selectively manipulated about a pivot point in more than two directions by a user;
a propulsion system configured to propel the powered handicap assist device; and
a control system coupled to the control member and the propulsion system, the control system configured to control operation of the propulsion system based on user engagement with the control member;
wherein the control system controls operation of the propulsion system according to a first mode when the degree of engagement of the user with the control member is within a predefined range defined by a lower threshold and an upper threshold; and
wherein the control system controls operation of the propulsion system according to a second mode different from the first mode when the degree of engagement of the user with the control member is greater than the upper threshold and when the degree of engagement of the user with the control member is less than the lower threshold.

14. The powered handicap assist device of claim 13, wherein the control member includes a vehicle accelerator control.

15. The powered handicap assist device of claim 14, wherein the degree of engagement is defined by a degree of rotation of the accelerator control.

16. The powered handicap assist device of claim 14, wherein the degree of engagement is defined by an amount of force applied to the accelerator control.

17. The powered handicap assist device of claim 14, wherein the degree of engagement is defined by both a degree of rotation of the accelerator control and an amount of force applied to the accelerator control.

18. The powered handicap assist device of claim 13, wherein the control system is configured to control operation of the propulsion system according to the second mode based on the control member being at a position of maximum deflection for a minimum threshold period of time.

19. The powered handicap assist device of claim 13 wherein the control system is configured to control operation of the propulsion system according to the second mode by sending a control signal to a vehicle braking systems to actuate a brake.

20. The powered handicap assist device of claim 13, wherein the control system is configured to control operation of the propulsion system according to the second mode based on determining that the degree of engagement is within the predefined range after being outside of the predefined range for a threshold amount of time.

21. The powered handicap assist device of claim 20, wherein the control system controls operation of the propulsion system according to the second mode until a release input is received.

22. The powered handicap assist device of claim 13, further comprising a safety mechanism, wherein the control system is configured to actuate the safety mechanism when controlling the propulsion system according to the second mode.

23. The powered handicap assist device of claim 22, wherein the safety mechanism includes a brake device.

24. The powered handicap assist device of claim 22, wherein the safety mechanism includes a traction control system.

25. A handicap assist system, comprising:
a walker including a grip portion having a grip control configured for engagement with a user's hand; and
a control system configured to control operation of equipment based on physical engagement of the user with the grip control;
wherein the control system is configured to maintain the equipment in an inactive state based on the degree of engagement being within a normal usage range; and
wherein the control system is configured to activate the equipment based on the degree of engagement being above the normal usage range and based on the degree of engagement being below the normal usage range.

26. The system of claim 25, wherein the engagement of the user with the grip control is defined by a pressure applied to the grip control by the user.

27. The system of claim 25, wherein the degree of engagement includes the user releasing the control member.

28. The system of claim 25, wherein the grip control includes an outer surface having a sensor configured to sense an amount of pressure applied to the grip control by the user.

29. The system of claim 25, wherein the walker includes a brake system configured to apply a braking force to a wheel of the walker.

30. The system of claim 25, wherein the normal usage range is based on historic user data.

31. The system of claim 25, wherein the grip control includes a plurality of sensors, and wherein the degree of engagement is sensed by the plurality of sensors.

32. The system of claim 25, wherein the grip control includes a first grip control and a second grip control.

33. The system of claim 32, wherein each of the first grip control and the second grip control includes a plurality of sensors configured to sense the degree of engagement.

* * * * *